United States Patent
Teman et al.

(10) Patent No.: US 11,556,145 B2
(45) Date of Patent: Jan. 17, 2023

(54) SKEW-BALANCING ALGORITHM FOR DIGITAL CIRCUITRY

(71) Applicant: Birad—Research & Development Company Ltd., Ramat Gan (IL)

(72) Inventors: Adam Teman, Tel Mond (IL); Yehuda Kra, Modiin (IL); Tzachi Noy, Mazkeret Batya (IL)

(73) Assignee: Birad—Research & Development Company Ltd., Ramat Gan (IL)

(*) Notice: Subject to any disclaimer, the term of this patent is extended or adjusted under 35 U.S.C. 154(b) by 35 days.

(21) Appl. No.: 17/190,600

(22) Filed: Mar. 3, 2021

(65) Prior Publication Data

US 2022/0050492 A1 Feb. 17, 2022

Related U.S. Application Data

(60) Provisional application No. 62/984,796, filed on Mar. 4, 2020.

(51) Int. Cl.
*G06F 1/10* (2006.01)
*G06F 30/396* (2020.01)
*G06F 119/12* (2020.01)

(52) U.S. Cl.
CPC .............. *G06F 1/10* (2013.01); *G06F 30/396* (2020.01); *G06F 2119/12* (2020.01)

(58) Field of Classification Search
None
See application file for complete search history.

(56) References Cited

U.S. PATENT DOCUMENTS

| | | | | |
|---|---|---|---|---|
| 8,151,229 B1* | 4/2012 | Chang | ................ | G06F 30/3312 716/108 |
| 9,842,187 B1* | 12/2017 | Zejda | .................... | G06F 30/398 |
| 2002/0116685 A1* | 8/2002 | van Ginneken | ........ | G06F 30/39 716/113 |
| 2009/0309627 A1* | 12/2009 | Ranganathan | ..... | H03K 19/0033 326/14 |
| 2012/0030642 A1* | 2/2012 | Mottaez | .................. | G06F 30/30 716/134 |
| 2015/0074445 A1* | 3/2015 | Huang | ................. | G06F 9/3885 713/502 |
| 2015/0199462 A1* | 7/2015 | Chang | .................... | G06F 30/30 716/108 |
| 2017/0004244 A1* | 1/2017 | Paik | ....................... | G06F 30/39 |

OTHER PUBLICATIONS

D. C. Wong et al., "Designing high-performance digital circuits using wave pipelining," IEEE TCAD, 1993.
O. Hauck and S. Huss, "Asynchronous wave pipelines for high throughput datapaths," IEEE International Conference on Electronics, 1998.
S. Sethupathy et al., "Logic restructuring for delay balancing in wave-pipelined circuits: an integer programming approach," in SYNASC, 2005.
L. Cotten, "Maximum-rate pipeline systems," in SJCC, 1969.
(Continued)

*Primary Examiner* — Phil K Nguyen
(74) *Attorney, Agent, or Firm* — Dekel Patent Ltd.; David Klein (57) ABSTRACT

A method for minimizing the skew (balancing) between all paths arriving at the inputs ports of each gate within a given combinatorial circuit.

9 Claims, 4 Drawing Sheets

(56) References Cited

OTHER PUBLICATIONS

W. P. Burleson et al., "Wave-pipelining: a tutorial and research survey," IEEE TVLSI, vol. 6, No. 3, pp. 464-474, 1998.
N. Kim and Y. Kim, "Automating wave-pipelined circuit design," in IEEE design and test of computers, 20(6), pp. 51-58, IEEE, 2003.
O. Zografos et al., "Wave Pipelining for Majority-based beyond-CMOS Technologies," in DATE '17, pp. 1306-1311, 2017.

* cited by examiner

SKEW-BALANCING ALGORITHM FOR DIGITAL CIRCUITRY

FIELD OF THE INVENTION

The present invention relates generally to a scalable algorithm for skew-balancing digital circuitry or any combinatorial logic netlist, such as but not limited to, to support clock-less wave-propagated pipelines.

BACKGROUND OF THE INVENTION

I. Introduction to Prior Art

Clocked sequential pipelines are commonly applied to digital designs in order to increase computation throughput by adding intermediate sampling stages, thereby shortening the sample-to-sample propagation delay and increasing the overall clock rate. The maximum number of clocked stages is limited by the setup and hold timing constraints of the sampling elements, as well as the practical capability to functionally stage the design efficiently.

Alternatively, clock-less pipelines [1] suggest to eliminate the need for sampling stages by structuring the design in a manner that signal transitions of internal nodes occur at a very narrow and deterministic timing window, thereby enabling wave-propagation of the combinatorial evaluation. In this case, the maximum achievable throughput is determined by the worst max-to-min arrival time difference at the circuit output, rather than the worst propagation delay. Therefore, balancing the propagation of the signals through the circuit to reduce the skew between the output arrival times is the key factor in implementing such a design approach. In theory, this should be able to provide a significant speedup as well as power and area savings. However, when considering complex designs that are composed of thousands of gates, the feasibility of existing skew-balancing algorithms and methods, such as suggested in [1]-[3], is questionable. These methods often neglect or roughly approximate secondary effects in idealized delay-graph representations; however, in reality, these effects accumulate into large gaps, which exceed the base modeling assumptions of the algorithms—especially in advanced manufacturing nodes.

II. Prior Art

The concept of wave-pipelining, originally called maximum-rate pipelining, was used in the floating point unit of the IBM 360/91 and described by Cotten in 1969 [4]. As opposed to standard synchronous systems, which set the clock rate according to the length of the longest path delay through the circuit, Cotten observed that for wave-pipelines, the rate at which logic can launched and captured depends on the skew between the longest and shortest path delays:

$$Trate > tlogic(max) - tlogic(min) + tsetup + thold \quad \text{(Equation 1)}$$

where Trate is the rate that new data is launched (and captured); tlogic(max) and tlogic(min) are the longest and shortest logic path delays, respectively; and tsetup and thold are the setup and hold constraints of the capture registers, respectively. Note that Equation 1 disregards the clock skew between the input and output registers. The latency between the clock edge that launches the data and the edge that latches the data at the end of the circuit is denoted TL and is roughly equal to the maximum logic delay path. Accordingly, the circuit speedup, N, which is essentially the number of waves that are propagating through the circuit in parallel is limited by N<TL/Trate. In other words, higher speedup can be achieved by minimizing the skew between the longest and shortest delays through the circuit. This enables the design of a sequential circuit with high-throughput, without the need to add pipeline registers, which are costly in terms of area, propagation delay, clock tree complexity, and power.

Following IBM, several other groups designed, implemented, and analyzed the concept of wave-pipelining; however, all of the implementations were designed using manual design techniques to balance circuits of fixed-delay gates. The seminal work by Wong, et al. [1], was the first to propose an automated algorithm for implementing CWPP. The proposed algorithm initially applies a rough tuning step, in which delay buffers are inserted for a first level of balancing, followed by a fine tuning step, in which the drive strengths of gates are adjusted to achieve better balancing. The authors conclude that CMOS logic is not well-suited for CWPP, because gate delay depends on the specific input pattern, and therefore, demonstrate their proposed approach on a 63-bit population counter generated with ECL/CML technology gates.

A number of years later, Burleson, et al. [5], provided an extensive review of the work on CWPP that had been published until then. In this invention, the inventors overview the sources of delay variation that make the implementation of CWPP challenging and the open problems that were yet to be solved at the time. A later study by Kim and Kim [6] advances the idea of automating CWPP design by first utilizing commercial synthesis tools to generate an initial netlist, and thereafter applying a simplified balancing method to reduce the skew between the outputs. This approach achieved a 20% delay deviation between maximum and minimum delays for low-order adders and multipliers. However, their implementation required a custom and limited standard cell library, which leads to a tremendous cost in overall area and power when implementing scaled designs, as compared to implementations using rich commercial CMOS libraries with complex cells.

A recent study by Zografos, et al. [7], has proposed a majority-inverter graph synthesis approach for the application of CWPP to beyond-CMOS technologies. Other than that, very few papers have suggested using CWPP in the recent past, and those that have, have done so on very small and limited circuits. Despite the automation flows proposed in previous studies, they all require special technologies and/or suffer from constraints that limit their scalability. As of now, no solution has been proposed for the integration of CWPP into common ASIC flows using pre-characterized standard cell libraries and sign-off closure methodologies.

SUMMARY

Clock-less Wave-Propagated Pipelining is a long-known approach to achieve high-throughput without the over-head of costly sampling registers. However, due to many design challenges, which have only increased with technology scaling, this approach has never been widely accepted and has generally been limited to small and very specific demonstrations. The present invention solves these problems by presenting WavePro, a generic and scalable algorithm, capable of skew balancing any combinatorial logic netlist for the application of wave-pipelining. The algorithm was implemented in the WavePro Compiler automation utility, which interfaces with industry delays extraction and standard timing analysis tools to produce a sign-off quality result. The utility is demonstrated upon a dot-product accelerator in a 65 nm CMOS technology, using a vendor-provided standard cell library and commercial timing analysis tools. By reducing the worst-case output skew by over 70%, the test case example was able to achieve equivalent throughput of an 8-staged sequentially pipelined implementation with power savings of almost 3×.

In this invention, we provide a scalable algorithm for skew-balancing any combinatorial logic netlist to support clock-less wave-propagated pipelines (CWPPs). The proposed algorithm iteratively applies small incremental balancing steps to adjust the skew at the output of each gate in the circuit according to actual delays extraction and timing analysis feedback. By applying a self-timed wave launch and capture mechanism, the algorithm is able to tolerate the variation at advanced nodes. We have further developed an automation utility, called WavePro Compiler, which implements the proposed algorithm, by analyzing the timing-state of the design to adjust the node delays until skew-balancing convergence is achieved. WavePro Compiler interfaces with industry-standard delay extraction and timing analysis tools, and therefore, correction feedback takes into account the non-idealities that characterize scaled technology processes, interconnect parasitics, and complex logic gates. The proposed utility was used to implement a CWPP dot-product calculation inside a vector multiplication accelerator. By using the WavePro Compiler to generate the dot-product unit in a 65 nm CMOS technology, a speedup comparable to a 8-stage pipeline was achieved, albeit with 3× lower power consumption.

In this invention, we propose a scalable automation algorithm for implementing CWPP on a generic netlist, using CMOS technology, and meeting industry standard sign-off requirements. The proposed approach addresses many of the issues that were either disregarded by previous studies (e.g., conditional delay arcs and fanout balancing) or less relevant in older process technologies (such as wire delay dominance). The algorithm is implemented in an automation utility we have developed called WavePro Compiler that interfaces with commercial electronic design automation (EDA) tools to provide the following non-limiting features:

1) Can apply clock-less wave-pipelining to any combinatorial logic block that is a candidate for pipelining.

2) Uses standard CMOS libraries, with the option to improve results by introducing a small number of specialized cells.

3) Mitigates process variations in a manner that is more effective than sequential pipelines.

4) Outputs a final design that can be verified through conventional ASIC flows using commercial tools to meet a specified performance target.

Accordingly, the invention provides a method for balancing (timing-wise) a circuit and all internal circuit paths. One application of the invention is the clockless wave propagated pipeline described in detail below, which achieves high throughput datapaths with reduced power consumption. Other applications of the invention include, but are not limited to, reducing glitch power, minimizing current rush/EMI (electromagnetic interference), reducing information leakage (data processing activity, etc.), and reducing aging effects.

BRIEF DESCRIPTION OF THE DRAWINGS

The present invention will be understood and appreciated more fully from the following detailed description taken in conjunction with the drawings in which:

FIGS. 1A and 1B are schematic illustrations of equalized delays, in accordance with a non-limiting embodiment of the invention, wherein FIG. 1A illustrates a single gate with equalized input port delays, and FIG. 1B illustrates a larger circuit with equalized delays;

DETAILED DESCRIPTION

III. Proposed Skew Balancing Algorithm

The previous section showed that in order to achieve maximum speedup, the skew between the arrival times of all paths to the capturing register should be minimal. Considering a circuit with multiple input registers and multiple output registers, albeit lacking any combinatorial loops inside the logic, a very large number of such paths exist. In order to transform the problem into a simple graph, we connect all circuit outputs (inputs of capture registers) to a single virtual output gate. The skew balancing target is to equalize the arrival time (AT) of all paths to the input ports of the virtual output gate. Note that there is no need for a virtual input gate, as all paths originate from a single point—the wave clock signal—which has an arrival time of zero. This approach has the benefit of also taking the register propagation delay (clk-to-q) into consideration for balancing.

Figure 1A:
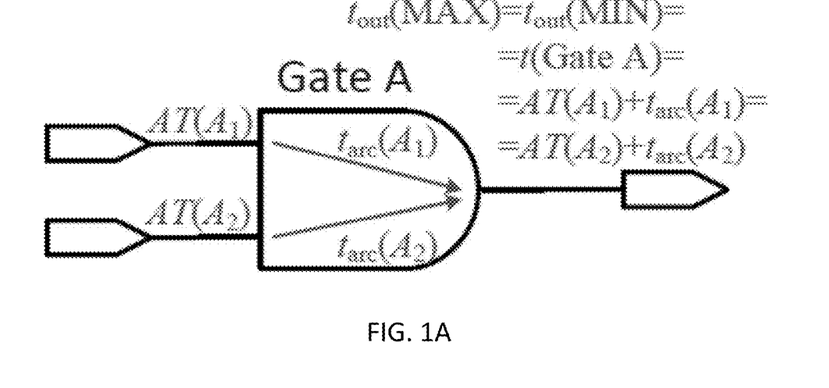

Using an illustrative example, we will now explain the skew balancing concept for a given circuit. FIG. 1A illustrates the smallest subset of the circuit—a single gate—including arrival times at its input ports and propagation delays through its timing arcs. Neglecting the difference between rising and falling arcs through the gate (this point is addressed later below), we observe that if the paths through all input ports are equal (note: the path delay is the sum of the arrival time at the input port and the delay arc from that port to the output), then the minimum and maximum path delays through that gate are equal.

Figure 1B:
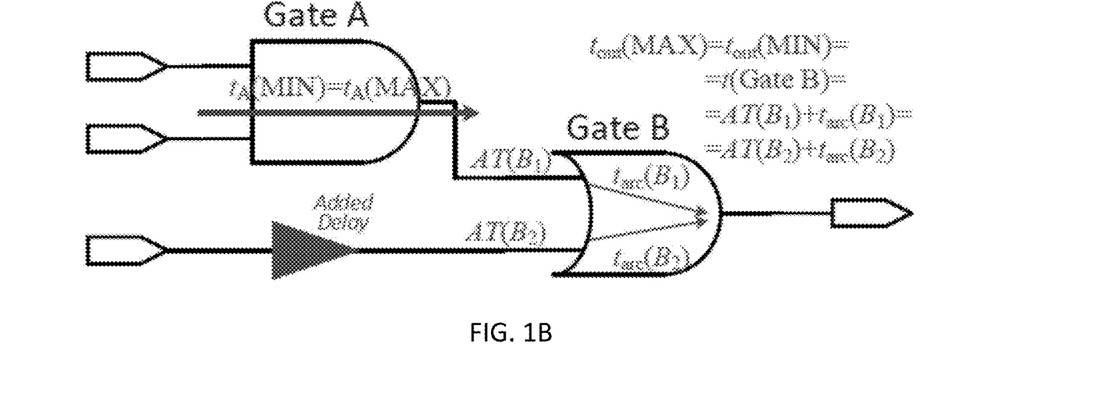

This concept is then expanded by taking an additional gate from our circuit, which we denote "Gate B" in FIG. 1B. If we equalize the path delays through all input ports of Gate B, all paths through the circuit will again have the same latency. In order to equalize the arrival times to the virtual output gate, it is sufficient to individually equalize the minimum and maximum arrival times to the output port of each intermediate gate. This is the basis for our skew balancing approach, as the concept can be expanded to any combinatorial circuit without loops.

Algorithm 1 Skew Balancing algorithm

```
1: procedure BALANCE STEP(netlist,δ)
2:     for each cell in netlist do
3:         t_max (cell) ← 0  ▷ initialize max arrival at cell output
4:         t_max (port) ← 0  ▷ initialize max arrival at cell inputs
5:         for each port of cell do
6:             t_max (port) = AT(port) + t(arc)
7:             t_max (cell) = max (t_max(cell), t_max(port))
8:         for each port of cell do
9:             t_gap (port) = t_max (cell) - t_max (port)
10:            INSERT_DELAY (port, t_gap(port), δ)
11: procedure BALANCE CONVERGENCE(netlist, δ)
12:    while skew > target do
13:        Perform Timing Analysis
14:        Annotate arrival time for netlist nodes
15:        BALANCE_STEP(netlist, δ)
```

Algorithm 1 describes the proposed skew-balancing algorithm, which is the central piece of the WavePro Compiler utility that we introduce in Section V. Since it is always possible to delay the propagation of a fast path, but not always feasible to reduce the delay through a slow path, the WavePro algorithm slows down faster paths to equalize the skew at every gate. This is done by annotating the maximum arrival time to each gate output port through all its input ports and then adding a delay to the input ports with an earlier arrival time, such that eventually all maximum arrival times are equal. Note that, since all minimum arrival times have been delayed, now the maximum and minimum paths are equal, and therefore, we can continue to only refer to the maximum path.

This method of skew balancing is achieved by the BALANCE STEP procedure in Algorithm 1. The algorithm iterates over all the cells (logic gates in the netlist), finds the maximum delay to the cell output port of the gate (tmax (cell)) and the difference between the maximum delay and the delay through each input port (tgap(port)). A delay is then inserted at each input port, except for the port on the maximum delay path, thereby equalizing the skew at that gate. Note that since delays are added only on the faster paths and the added delay is smaller than tgap(port), tmax (cell) is not altered.

In an ideal mathematical delay model, where the internal timing arcs of all cells have a fixed delay and any arbitrary delay could have been applied to a port, a single flow iteration may have been sufficient to balance the entire netlist. However, in reality, after a single iteration, the netlist is far from being balanced due to significant side effects arising from the inserted delay cells that affect both the net load and the gate output transitions. This leads to different actual delays on cell arcs than assumed prior to the iteration. In order to deal with these side effects, we apply an iterative convergence approach, where during each iteration, we fully calculate the timing and skew gaps, but fix only a parameterized percentage of the skew gap per net. These iterations are repeated until the skew gap is negligible. The BALANCE CONVERGENCE procedure in Algorithm 1 describes these iterations, by applying a convergence factor (δ) that represents the partial skew correction amount relative to the calculated skew gap at each step. Our experiments show that a value of δ~0.1 provides a reasonable convergence rate, which roughly means that each iteration fixes approximately 10% of the remaining margin.

IV. Overcoming Wave Pipelining Implementation Challenges

In Section II, we provided an overview of previous wave pipelining studies, and stated that several challenges have prevented widespread adoption of this approach and/or integration into a standard ASIC flow. In this section, we will briefly describe additional details that are added to the WavePro algorithm to deal with these issues.

A. Delay Application Previous studies have suggested various methods for delay application, such as insertion of buffers (delay cells) and resizing gates. While these are, indeed, two of the primary methods we propose to use for rough tuning, they are limited in their resolution and suffer from area and power overheads. As an alternative, we also propose swapping logically equivalent ports, relocating the placement of gates, and rerouting nets as additional, overhead-free, means of rough delay skewing.

For fine tuning, however, these methods are generally insufficient. Therefore, we propose adding capacitive or resistive delays during the later convergence algorithm iterations. Capacitive delays can be applied by extending wires as well as adding constant dummy gates to load a net, at the cost of power and area overheads. Resistive delays can be applied by conveying the signal through an always-on pass-gate. While this method has less of an impact on power, it deviates from the standard ASIC implementation flow, since pass-gates cannot be truly characterized as standard cells.

B. Delay Dependence on Input Pattern, Slew, and Load

When presenting the basic assumption for skew balancing in Section III, we noted that we assume rising and falling delays through a gate are equal, and also ignored the dependence on input slew and output load. These, of course cannot be disregarded, and are the main reason that previous works required designing special libraries [6] or avoided using CMOS logic altogether [1].

We address these challenges through the iterative process that slowly converges to a solution. By not attempting to fully balance the circuit at each iteration, the algorithm is able to adapt to the actual timing that is extracted, including specific arcs, slew rates, and loads. Furthermore, as described in Section V, the WavePro Compiler utility interfaces with industry standard tools to extract accurate timing data following each iteration.

That being said, there is one challenge in this regard that has been overlooked by the majority of the previous studies—conditional timing arcs. For primitive gates, such as NAND, NOR and Inverter gates, a given input transition can only cause one type of transition at the output. However, for more complex cells, such as XOR, MUX, and Full Adder, conditional transitions may occur, depending on the state of the other inputs. For example, if the static input of a 2-input XOR gate is a '1', the gate is inverting, while if it is '0', the gate is non-inverting. The use of an abundance of conditional arcs with large differences between the delays of different conditions can result in significant overall skew across an entire wave-propagation circuit.

We propose two approaches to address the issue of conditional arcs. The first and most straightforward approach is to remove cells with conditional arcs from the target library. However, for some designs, this results in huge overhead in the resulting netlist. The other approach is to provide a number of pre-balanced custom complex cells designed and optimized for minimizing the conditional arc delay gap. While this mitigates the problem, such cells are not provided in most standard cell libraries, and therefore, this adds complexity to the implementation flow.

C. Dealing with Clock Skew

In Equation 1, we noted that we had disregarded the clock skew between the circuit inputs and between the captured outputs, which was included in some previous studies, albeit, according to very rough estimations. However, since clock skew is a deterministic feature of a timing path, the WavePro algorithm can inherently address it from within the balancing procedure. For the launching registers, the path start point is the clock root, and therefore, the clock insertion delay to each register is taken into account in maximum arrival time calculation. For the capture registers, clock skew is just a relative delay between the sampling points at the set of registers, and therefore, this can be extracted from the design and added as an additional delay on the timing arc to the virtual output node. Note that clock skew is only taken into account after clock tree synthesis, as described in the utility flow of Section V.

D. Dealing with Fanout

Delaying a net as part of the balancing algorithm delays all of its fanout ports. Since fanout ports belong to different gates, this may add unwanted delay to an already balanced connection, which will need to be fixed during the next iteration. Over multiple iterations, this may cause the design to blow up in size and the overall balancing attempt to diverge. To avoid this, an initial signal-splinting phase is applied, in order to isolate ports that share the same nets, and therefore, have conflicting timing requirements. This can be solved in a straightforward manner by buffering all such net destinations, thereby allowing the delay fixing to take place only on the desired buffered segment. Our WavePro utility applies a more advanced approach leading to lower overhead by buffering together fanout signals to achieve the common portion require delays. In addition, for some designs, such as the arithmetic trees demonstrated in Section VI, single fanout connectivity dominates the circuit, such that very little high-fanout buffering is needed and the overhead is small.

E. Process Variation Tolerance

Probably the single-most problematic issue in the implementation of CWPP—especially in modern technology nodes—is overcoming process variations and varying operating conditions. Virtually all previous studies targeted setup and hold constraints for a latency of a fixed number of system cycles, ensuring that the output registers would capture the data within a calculated timing window. However, since operating conditions and process variations highly affect both the overall propagation latency, as well as the accumulated balancing skew, this is an almost impractical requirement.

To overcome this challenge, we integrate a self-timed clocking scheme that is adaptive to the operating conditions and to local on-chip variation. Instead of pre-calculating a multiple of clock cycles, after which the data is to be sampled, the capture clock is instead treated as a delay path that is balanced along with the propagated logic wave. This approach can be envisioned as a transmission channel, where the clock travels alongside the data under the same conditions. Such an approach is commonly applied in high speed serial interfaces, only that in our case, the channel is also capable of performing a piped logical calculation along the channel.

Figure 2:
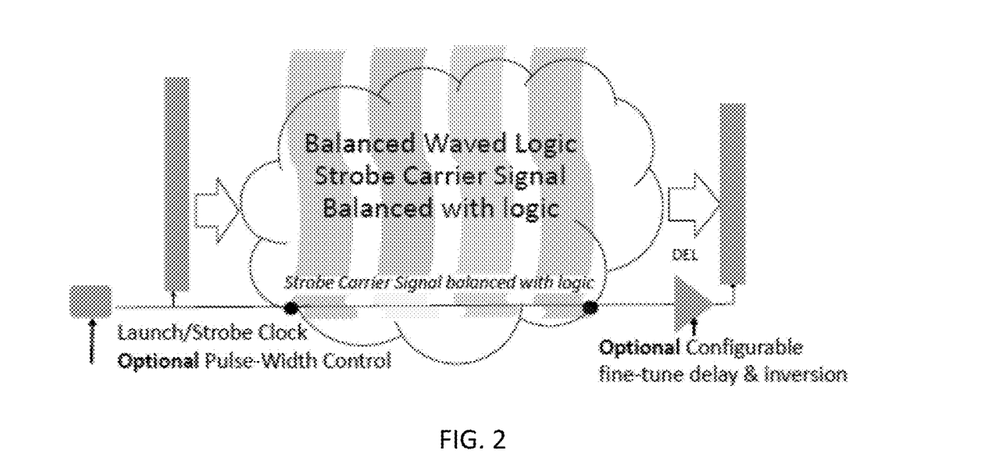
FIG. 2 is a schematic illustration of a self-timed clocking approach.

Implementation of the proposed self-timing approach is illustrated in FIG. 2. In addition to launching the input data, the launching (or strobe) clock is released into the wave-propagation logic and connected to the virtual output node. After balancing, the strobe clock will reach the capture registers at the same point of the maximum path delay through the logic. Therefore, an additional margin is added to take into account register setup time. This margin can be implemented with a configurable delay to enable fine tuning of the sampling point, such that it is as close as possible to the middle of the timing window. In fact, this configurable margin provides a post-silicon remedy to fixing hold violations, which are otherwise considered fatal for conventional sequential design.

F. Sign-off Compliance

A primary requirement for adoption of a design methodology within a commercial product is to meet industry standard validation processes, better known as sign-off compliance. Since our implementation is achieved using CMOS standard cell libraries, the methodology for performing timing verification with the proposed algorithm is straightforward. For each process corner, a target clock period is calculated as a full divisor of the delay through the wave circuit. This is defined as the period of the launching clock, and the path through the wave circuit is defined as a multi-cycle path for both setup and hold, which is valid due to the previously described self-timing approach. As opposed to standard sequential design, where setup and hold need to be validated independently for all specified corners, the self-timed strobe clock enables a clock-data skew validation at each corner, rather than absolute max and min-path calculations. This methodology can be applied within any industry standard timing engine, including parasitic extraction and usage of any required gate timing model, thereby complying with standard sign-off requirements.

V. The Wavepro Compiler

Figure 3:
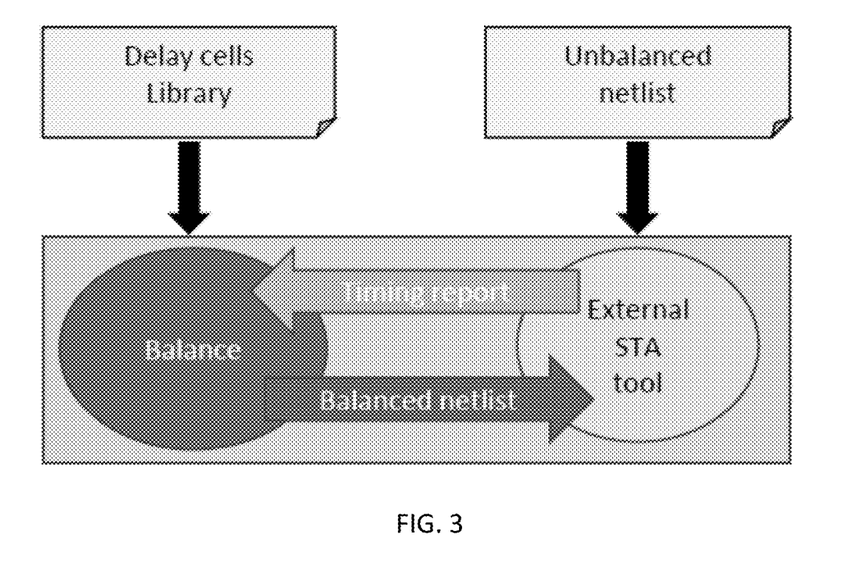
FIG. 3 is a schematic illustration of the WavePro compiler skew balancing flow, in accordance with a non-limiting embodiment of the invention.

The WavePro algorithm, described in Section III, including many of the additional approaches presented in Section IV, was implemented in a Python based utility called the WavePro Compiler. The flow of the utility is shown in FIG. 3. A non-balanced netlist is fed in to the utility along with a custom or standard cell library. The netlist is iteratively passed through an (external) timing analysis tool to extract the accurate delay state of the netlist, and the timing information (in the SDF format) is fed back into the utility. Thereafter, the BALANCE STEP procedure of Algorithm 1 is applied to provide a balance-improved netlist, which is sent back to the timing analysis tool to generate updated timing information. The process is repeated until no skew improvements are achieved.

Since the WavePro Compiler interfaces with any commercial timing analysis tool by using standardized formats, the algorithm can be applied during any stage of the design. In general, the first iteration will probably be applied based on a synthesis netlist with an ideal clock and wireload models, but the output netlist can be sent through placement, clock tree synthesis, and routing, before the next iteration of timing analysis. Therefore, all parasitics will be accounted for during the incremental steps that are carried out during the implementation until convergence is reached.

VI. Test Case Demonstration

Figure 4:
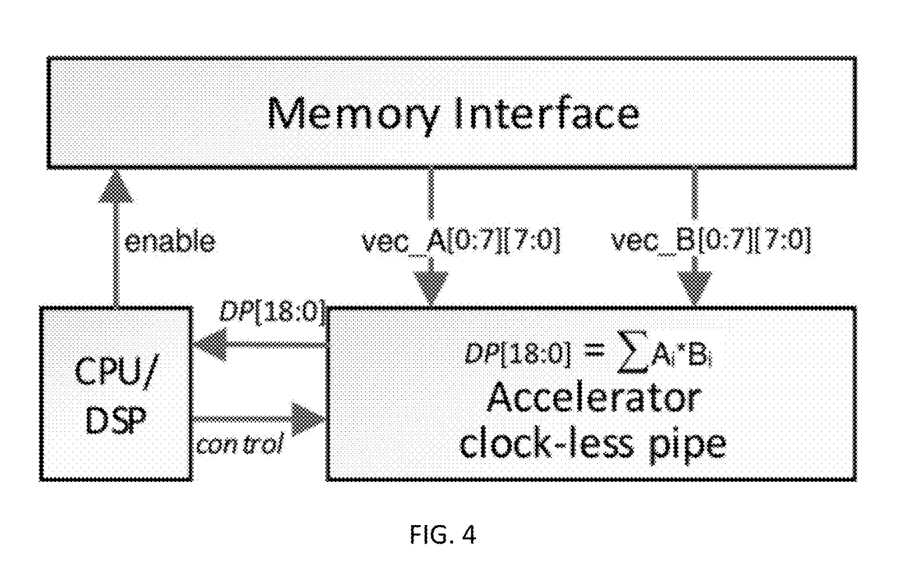
FIG. 4 is a schematic illustration of a dot-product accelerator, in accordance with a non-limiting embodiment of the invention.

To demonstrate the proposed algorithm and utility, we implemented dot-product (DP) accelerator for vector multiplication, as illustrated in FIG. 4. For calculating a DP vector multiplication, the processor initiates a transaction directly from the memory to the accelerator. The accelerator fetches a pair of 64-bit vectors, each composed of eight 8-bit integer values, and outputs the dot-product of the input operands at a rate of a full calculation per wave-period. Considering that several memory words can be buffered to feed the DP unit at a higher rate than the memory access frequency and the DP scalar result handling can be done at a lower rate than the separate vector calculations, this architecture can achieve an overall throughput speedup by independently accelerating the DP unit.

Figure 5:
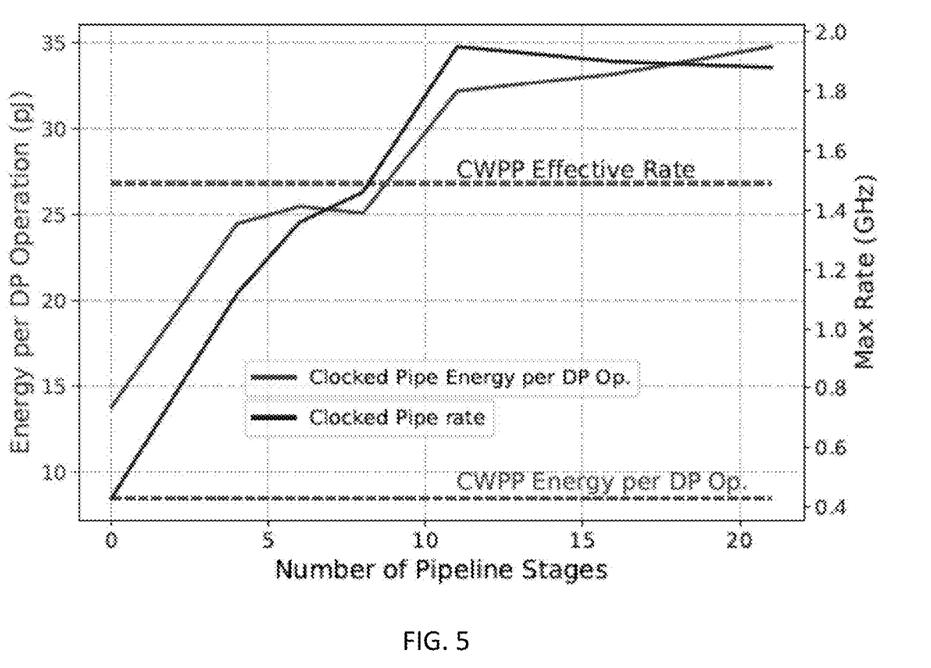
FIG. 5 is a graphical illustration of energy per DP operation as a function of re-timed pipe stages, and the achieved operation rate (clocked pipe rate), in accordance with one non-limiting embodiment of the invention.
Figure 6:
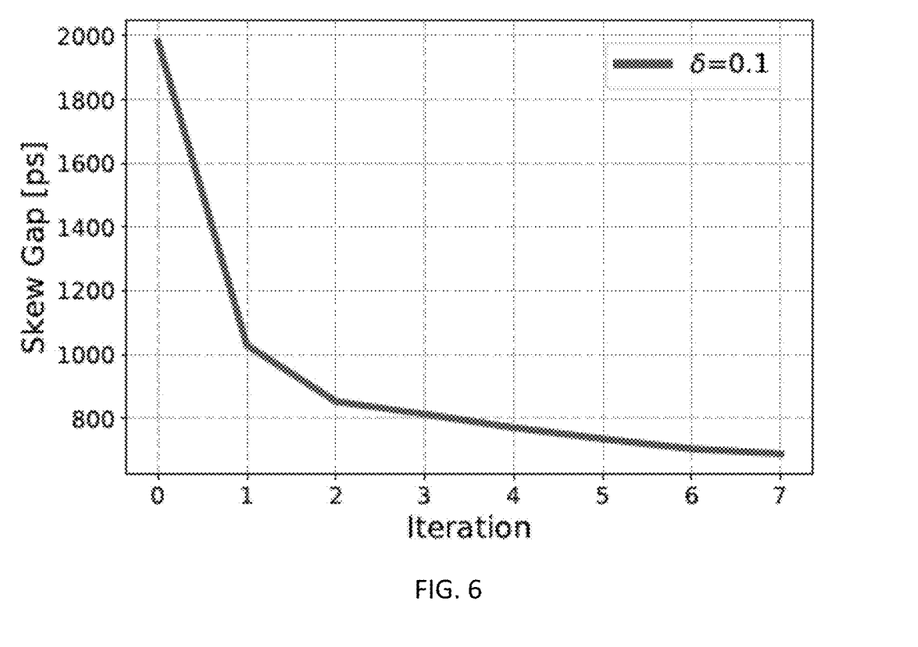
FIG. 6 is a graphical illustration of skew balancing convergence, in accordance with one non-limiting embodiment of the invention.

The test case DP accelerator was first implemented with a standard sequential design flow for comparison, using a commercial 65 nm standard cell library. The DP unit was synthesized with Cadence Genus, using the re-timing functionality to vary the number of pipeline stages in the resulting implementation. FIG. 5 shows the maximum frequency as a function of the number of inserted pipeline stages (blue line), reaching a peak of 1.95 GHz for an 11-stage pipe. In addition, the figure shows the energy cost per dot-product operation, which is over 32 pJ for the maximum achievable frequency. To demonstrate the proposed approach, the DP accelerator was implemented using the WavePro Compiler. FIG. 6 shows the gradual convergence of the skew, as the design passed through balancing iterations with a δ convergence factor of 0.1. The tool was able to reduce the skew by over 70%, with the final balanced netlist enabling a data launch rate of 1.49 GHz. While this throughput is, as expected, not as high as what was achieved with a heavily pipelined sequential implementation, the power savings are immense. The dotted lines on FIG. 5 represent the effective rate achieved through CWPP (blue) and the energy cost (green). The cross-over point between the solid blue and dotted blue lines, representing where the sequential pipeline provides similar throughput as the CWPP implementation, occurs for an 8-stage pipeline. The results are summarized in Table I, showing that the CWPP approach provides almost a 3× reduction in power, as compared to the equal throughput 8-stage pipe, which also requires almost 900 additional registers.

TABLE I

Power consumption comparison

| Pipeline Architecture | Wave Period[ns] | Giga DP Ops/sec | # Flip-Flops | Seq. Power | Comb. Power | Energy per DP calculation [pJ] |
|---|---|---|---|---|---|---|
| Non-piped Circuit | 2.91 | 0.34 | 0 | 0 | 17.4 | 13.8 |
| Sequential 8-stage Pipe | 0.68 | 1.47 | 897 | 13.52 | 11.62 | 25.14 |
| Sequential 11-stage Pipe | 0.51 | 1.96 | 1483 | 21.36 | 10.81 | 32.17 |
| Balanced Wave | 0.67 | 1.49 | 0 | 0 | 10.1 | 8.5 |

Figure 7:
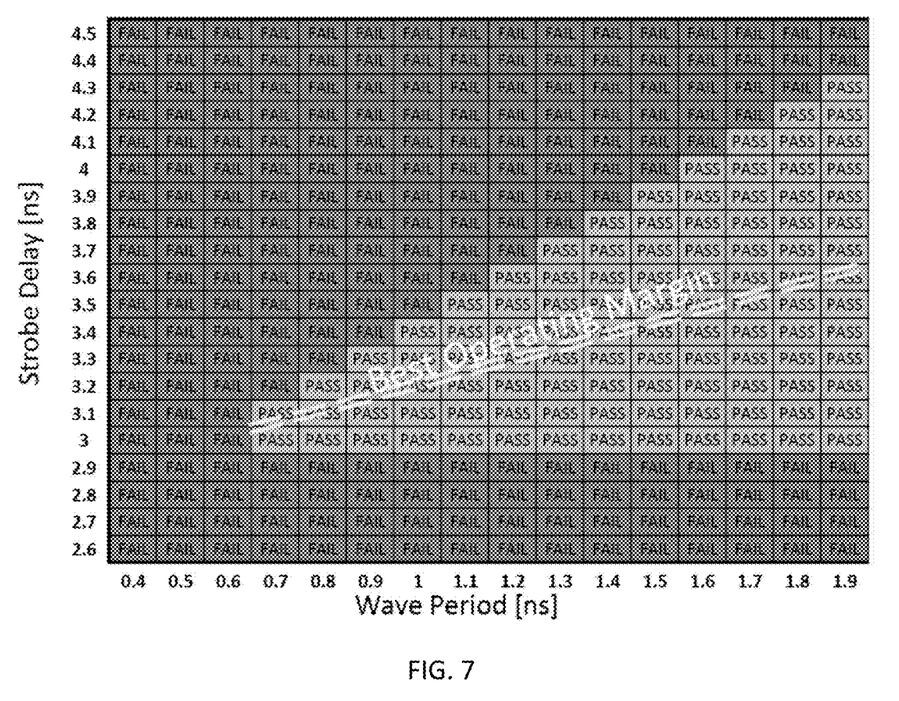
FIG. 7 is a graphical illustration of the Shmoo plot for wave period and strobe delay.

To further prove the validity of the implemented designs beyond static timing analysis, we carried out logic simulations with back annotated timing data, while parametrizing the data launching rate (wave-period) and the strobe delay (output capture time). Since the strobe clock is self-timed, the difference in strobe delay is adjusted by the configurable margin (see FIG. 2). The pass and fail regions are shown in the Shmoo Plot of FIG. 7. While the circuit can be operated anywhere within the green area, best practice would be to adjust the margin to be in the middle of the passing region. Note that this ability to adjust the margin post-silicon is, in fact, a unique method to overcome hold violations.

Figure 8:
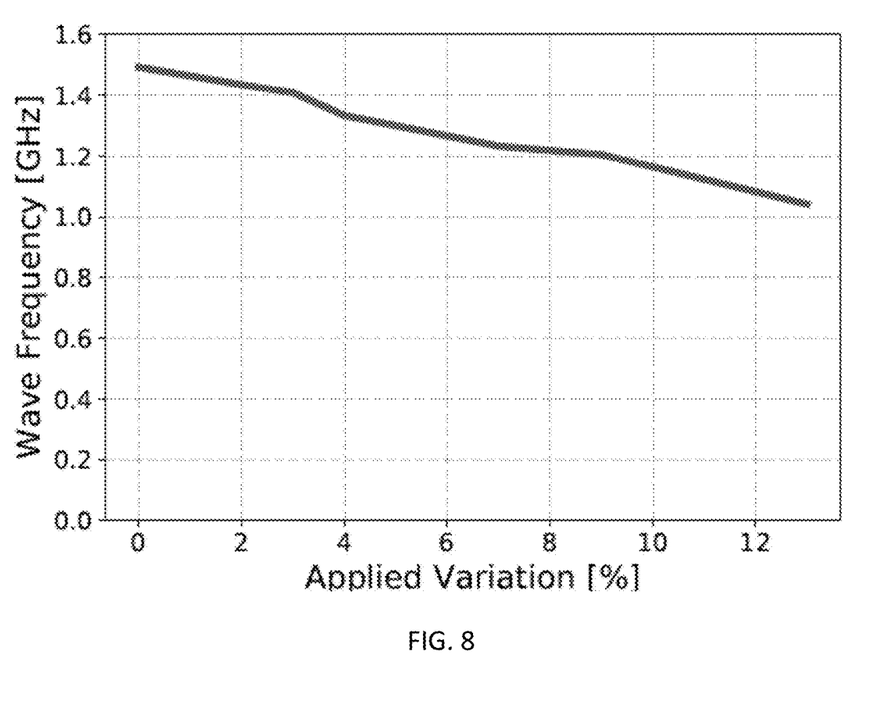
FIG. 8 is a graphical illustration of the process variation sensitivity.

In addition to corner simulations, we analyzed the effect of local variations by applying a random positive or negative derating factor per timing arc in the design and checked the impact on the minimal functioning wave period. Results are captured in FIG. 8, which indicates that for 10% random derating which is commonly applied by industry practice we lose about 25% in performance, but still maintain the 3× power saving range.

VII. Conclusions

In this invention, we provide WavePro, a utility for implementing clock-less wave-propagated pipelining on any combinatorial logic block that is a candidate for pipelining. The WavePro utility is based on a novel algorithm that iteratively delays the propagation of signals through logic gates in order to minimize the skew at the outputs of the circuit. By using standard cell libraries and interfacing with commercial timing analysis and physical implementation tools, WavePro is compliant with standard ASIC flows and takes into account parasitic effects and variations of modern process technologies. For demonstration, we used WavePro to implement a dot-product accelerator with a 65 nm standard cell library, achieving throughput equivalent to an 8-stage pipeline with a 3× power reduction.

REFERENCES

[1] D. C. Wong et al., "Designing high-performance digital circuits using wave pipelining," IEEE TCAD, 1993.

[2] O. Hauck and S. Huss, "Asynchronous wave pipelines for high throughput datapaths," IEEE International Conference on Electronics, 1998.

[3] S. Sethupathy et al., "Logic restructuring for delay balancing in wave-pipelined circuits: an integer programming approach," in SYNASC, 2005.

[4] L. Cotten, "Maximum-rate pipeline systems," in SJCC, 1969.

[5] W. P. Burleson et al., "Wave-pipelining: a tutorial and research survey," IEEE TVLSI, vol. 6, no. 3, pp. 464-474, 1998.

[6] W. Kim and Y. Kim, "Automating wave-pipelined circuit design," in IEEE design and test of computers, 20(6), pp. 51-58, IEEE, 2003.

[7] O. Zografos et al., "Wave Pipelining for Majority-based beyond-CMOS Technologies," in DATE '17, pp. 1306-1311, 2017.

The invention claimed is:

1. A method for skew balancing between all paths arriving through input ports of each gate of a given circuit, the method comprising:
    annotating a maximum arrival time to each output port through all input ports and then adding a delay to the input ports with the less maximum arrival time, such that eventually all maximum arrival times are equal, thereby skew balancing between all paths arriving at output ports of each gate, and iterating over all gates and finding a maximum delay to the output port of each of the gates and finding a difference between the maximum delay and a delay through each input port, inserting an additional delay at each input port, except for the port with the maximum delay, thereby equalizing the skew at the gates.

2. The method according to claim 1, wherein all outputs arrive at a minimal skew at their capture destination.

3. The method according to claim 1, wherein all external primary input and output delays are compensated such that all paths are optimally equalized from their external launch sequential elements to their external capture sequential elements.

4. The method according to claim 1, comprising converting the given circuit to a clock-less wave propagating pipeline.

5. The method according to claim 3, comprising converting the given circuit to a clock-less wave propagating pipeline, and wherein there is an external launch clock signal associated with each of said external launch sequential elements and an external capture clock signal associated with each of said external capture sequential elements, and a path from the external launch clock signal to the external capture clock signal is delayed by the same delay as all combinatorial paths equalized through the clock-less propagating pipeline.

6. The method according to claim 1, wherein the skew balancing provides a post-manufacturing configurable fine-tune delay adjustment.

7. A method for skew balancing between all paths arriving through input ports of each gate of a given circuit, the method comprising:
annotating a maximum arrival time to each output port through all input ports and then adding a delay to the input ports with the less maximum arrival time, such that eventually all maximum arrival times are equal, thereby skew balancing between all paths arriving at output ports of each gate, wherein equalization convergence is achieved by iterative gradual incremental steps of partial correction, such that upon each step delays are analyzed at high accuracy towards next step corrections, providing optimal adaptation to side effects.

8. The method according to claim 7, wherein at upon each step, delays are extracted and analyzed to generate instructions for modifying the given circuit.

9. The method according to claim 7, wherein steps are executed as incremental corrections referred as Engineering Change Order (ECO), for timing consistency and optimal utility run time.

* * * * *